UNITED STATES PATENT OFFICE.

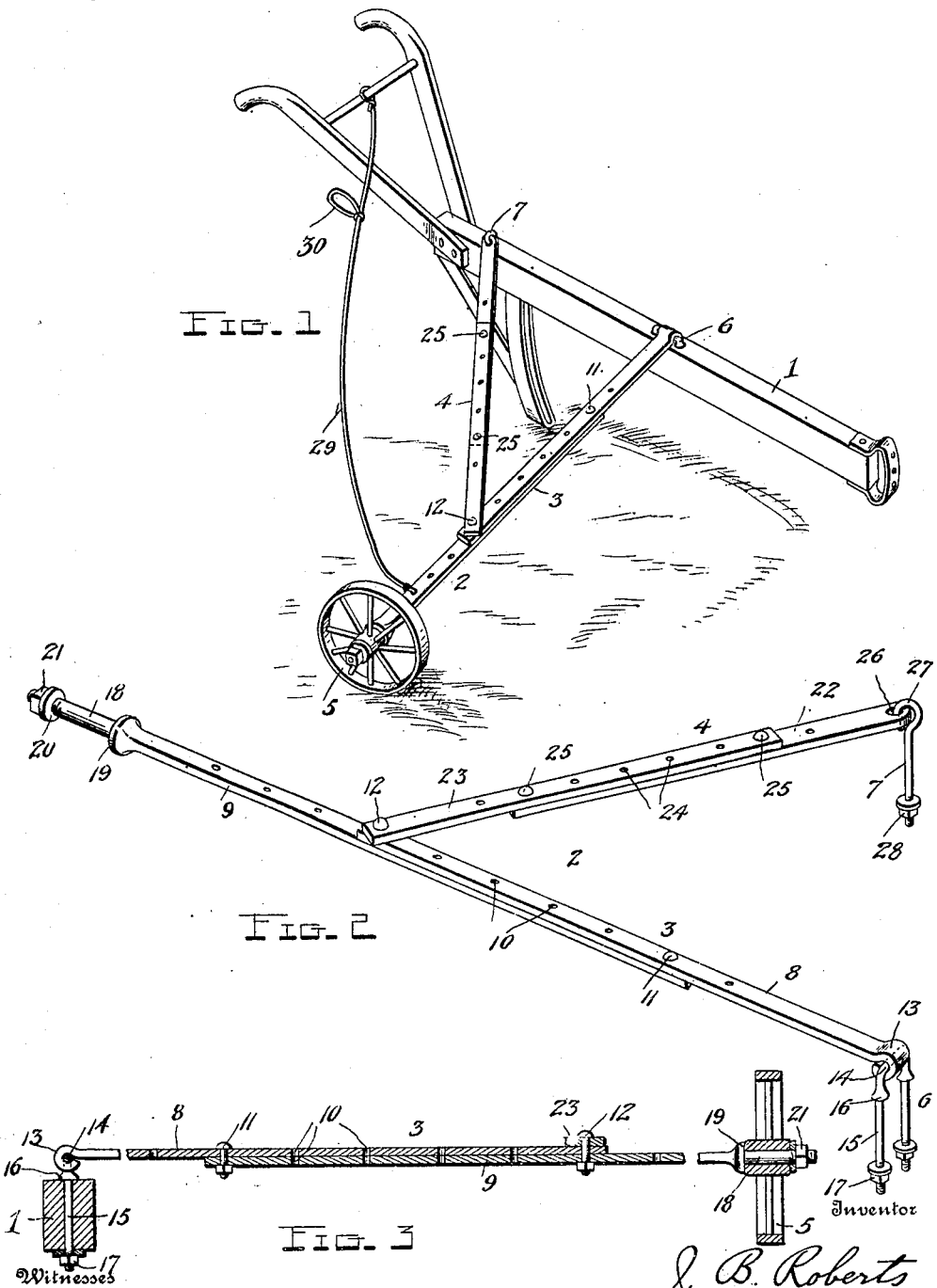

JAMES B. ROBERTS, OF GOLDSBORO, NORTH CAROLINA.

MARKER-GAGE FOR PLOWS, CORN-PLANTERS, AND THE LIKE.

No. 904,015.  Specification of Letters Patent.  Patented Nov. 17, 1908.

Application filed April 20, 1908. Serial No. 428,081.

*To all whom it may concern:*

Be it known that I, JAMES B. ROBERTS, a citizen of the United States, residing at Goldsboro, in the county of Wayne and State of North Carolina, have invented certain new and useful Improvements in Marker-Gages for Plows, Corn-Planters, and the Like, of which the following is a specification.

My invention relates to improvements in marker gages for plows, corn-planters and similar agricultural implements, and its primary object is to provide a simple and practical device which will make a line or mark upon the ground to serve as a guide for the next furrow or row.

A further object of the invention is to provide a device of this character which will be exceedingly strong and durable in construction, which may be manufactured at a comparatively small cost, and which may be quickly and easily applied to a seed-planter or similar agricultural implement of any form and construction.

With the above and other objects in view, the invention consists of the novel features of construction and the combination and arrangement of parts hereinafter fully described and claimed, and illustrated in the accompanying drawings, in which:—

Figure 1 is a perspective view of my improved marker gage applied to a plow; Fig. 2 is a similar view of the device on an enlarged scale, the marking wheel being omitted; and Fig. 3 is a longitudinal section through the gage bar or arm.

In the drawing, 1 indicates the beam or other portion of a plow, corn-planter or similar agricultural implement to which my improved marker gage 2 is applied. The gage consists of an adjustable gage bar or arm 3, an adjustable brace 4, a marking wheel 5, a U-bolt 6 and an eye-bolt 7. The gage arm 3 consists of two sections in the form of flat metal bars 8, 9 provided with longitudinal series of vertical apertures 10 arranged at equal distance apart and adapted to register with each other to receive clamping bolts 11, 12 which serve to adjustably unite said sections or bars, as more clearly shown in Fig. 3.

The inner end of the bar or section 8 is bent to form a pivot or hinge eye 13 which surrounds the cross portion 14 of the U-bolt 6. The latter has its arms or ends 15 passed through vertical openings formed in the beam 1 and so arranged that the cross or pivot portion 14 of the bolt extends longitudinally of the beam and thus disposes the gage arm 2 at right angles to the latter. The arms 15 of said bolt are formed with annular collars 16 which engage the top of the beam 1 and form stop shoulders to hold the pivot portion 14 a suitable distance above the beam. On the projecting threaded ends of the arms 15 are arranged washers and clamping nuts 17 which hold the bolt in the beam. The outer end of the bar or section 9 of the gage arm is shaped to provide a spindle 18 for the marking wheel 5. This spindle is cylindrical to fit the bore in the hub of said wheel and at its inner end is formed an annular stop collar 19 against which one end of the wheel hub bears. The outer end of the spindle is screw-threaded and receives a washer 20 and a nut 21 which latter retains the wheel upon the spindle as seen in Fig. 3. The wheel 5, it will be understood, may be of any suitable construction, and in place of it a marking device of any other form may be used, if desired.

The brace 3 is arranged diagonally in rear of the gage arm and consists of two similar flat metal bars or sections 22, 23 formed with longitudinal series of equi-distantly spaced apertures 24 to receive clamping bolts 25. The bolt 12 which clamps the sections of the gage arm together also passes through the bar 23 and thus serves to adjustably unite the gage arm and the brace. The inner end of the other section 22 of said brace is formed with an aperture or eye 26 to receive the eye 27 of the eye bolt 7 which latter is passed through a vertical aperture in the beam 1 and has upon its threaded lower end a washer and a clamping nut 28.

In order to permit the device to be readily swung from one side to the other of the plow I preferably provide a wire 29 which is attached at one end to the outer portion of the gage arm 2 and at its other end to the cross-rod connecting the handles of the plow. At a suitable point in said wire is formed a hand loop or grip 30 by means of which the wire may be easily grasped and pulled to swing the device over the plow beam.

The construction, use and advantages of the invention will be readily understood from the foregoing description taken in connection with the drawing. It will be noted that by making the gage arm 3 longitudinally adjustable the marking wheel may be positioned at any desired distance from the beam 1, thus permitting the rows to be located as far apart or as near together as may be desirable. By making the brace 4 longitudinally adjustable it may be secured upon either long or short beams, and the outer end of the brace may be connected to the gage arm at a sufficient distance from the pivot of the latter to effectively brace and reinforce it. By providing the U-bolt 6 and the eye-bolt 7 as the pivots and attaching means for the gage arm and its brace, a strong and durable construction is produced and one which will enable the invention to be quickly and easily applied to the beam or other portion of a plow, seed-planter or the like. To attach the invention to the beam it is only necessary to bore three holes for said bolts 6, 7 and then insert and secure the latter therein; after which the gage arm and its brace may be readily adjusted. As above noted said bolts 6, 7 also provide strong and durable pivots upon which the arm and brace swing as they are thrown from one to the other side of the beam according to requirements.

Having thus described my invention, what I claim is:—

In a marker gage, the combination with an agricultural implement, of a gage arm and a diagonal brace for the latter, both the arm and the brace being longitudinally extensible and each consisting of flat metal bars in overlapping engagement and formed at equally distant points with registering apertures, removable bolts in the latter to adjustably unite said bars, means for pivotally connecting the inner ends of the brace and arm to the implement, a fastening uniting the outer end of the brace to the arm, and a marking device upon the outer end of the arm.

In testimony whereof I affix my signature in presence of two witnesses.

JAMES B. ROBERTS.

Witnesses:
  GEORGE C. RASKLEY,
  P. H. SPUN.